United States Patent
Kommisrud et al.

(10) Patent No.: US 11,957,123 B2
(45) Date of Patent: Apr. 16, 2024

(54) FUNCTIONALIZED KIT FOR PREPARING HYDROGELS

(71) Applicant: SpermVital AS, Hamar (NO)

(72) Inventors: Elisabeth Kommisrud, Stange (NO); Anne Hege Alm-Kristiansen, Vang på Hedmarken (NO); Geir Klinkenberg, Heimdal (NO); Lars Kilaas, Trondheim (NO); Wilhelm Robert Glomm, Malvik (NO); Eugenia Mariana Sandru, Trondheim (NO); Heidi Johnsen, Trondheim (NO)

(73) Assignee: SpermVital AS, Hamar (NO)

( * ) Notice: Subject to any disclaimer, the term of this patent is extended or adjusted under 35 U.S.C. 154(b) by 803 days.

(21) Appl. No.: 17/058,232

(22) PCT Filed: Jun. 4, 2019

(86) PCT No.: PCT/EP2019/064468
§ 371 (c)(1),
(2) Date: Nov. 24, 2020

(87) PCT Pub. No.: WO2019/234010
PCT Pub. Date: Dec. 12, 2019

(65) Prior Publication Data
US 2021/0186008 A1  Jun. 24, 2021

(30) Foreign Application Priority Data

Jun. 4, 2018  (NO) .................................. 20180768

(51) Int. Cl.
*A61D 19/02*  (2006.01)
*A01N 1/02*  (2006.01)

(52) U.S. Cl.
CPC ......... *A01N 1/0231* (2013.01); *A01N 1/0226* (2013.01); *A01N 1/0268* (2013.01); *A61D 19/024* (2013.01)

(58) Field of Classification Search
CPC ..................................................... A61D 19/024
See application file for complete search history.

(56) References Cited

U.S. PATENT DOCUMENTS

| | | | |
|---|---|---|---|
| 4,990,601 | A | 2/1991 | Skjak-Braek et al. |
| 5,639,467 | A | 6/1997 | Dorian et al. |
| 6,497,902 | B1 | 12/2002 | Ma |
| 2017/0121700 | A1 | 5/2017 | Klinkenberg et al. |

(Continued)

FOREIGN PATENT DOCUMENTS

| | | |
|---|---|---|
| WO | 8603781 | 7/1986 |
| WO | 2008004890 A2 | 1/2008 |

(Continued)

OTHER PUBLICATIONS

International Search Report and Written Opinion for International Application PCT/EP2019/064468; International Filing Date: Jun. 4, 2019; dated Sep. 6, 2019; 16 pages.

(Continued)

*Primary Examiner* — Thaddeus B Cox
(74) *Attorney, Agent, or Firm* — Karen A. LeCuyer; DeWitt LLP

(57) ABSTRACT

The present invention relates to a kit suitable for preparing a sustained release composition, in particular for preparing a sustained release composition comprising spermatozoa embedded within an alginate matrix.

31 Claims, 1 Drawing Sheet

(56) References Cited

U.S. PATENT DOCUMENTS

2017/0189156 A1 7/2017 Schmitt
2017/0196669 A1 7/2017 Schmitt

FOREIGN PATENT DOCUMENTS

WO 2010117266 A1 10/2010
WO 2013076232 A1 5/2013
WO 2015181496 A1 12/2015
WO 2018104160 A1 6/2018

OTHER PUBLICATIONS

Norwegian Search Report for NO Patent Publicaiton No. 20180768; dated Dec. 20, 2018; 2 pages.
Roberts, R. et al.; "A design full of holes: functional nanofilm-coated microdomains in alginate hydrogels"; Journals of Materials Chemistry B, vol. 107, Issue No. 25; 2013; pp. 3195-3201.
Yoo, S. et al.; "A method for coating of hollow fiber membranes with calcium alginate"; Journal of Membrane Science, vol. 558; 2018; pp. 45-51.

FUNCTIONALIZED KIT FOR PREPARING HYDROGELS

CROSS REFERENCE TO RELATED APPLICATIONS

This application is a National Stage application of PCT/EP2019/064468, filed Jun. 4, 2019, which claims the benefit of priority to Norwegian Patent Application No. 20180768, filed Jun. 4, 2018, both of which are incorporated by reference in their entirety herein.

FIELD OF THE INVENTION

The present invention relates to a kit suitable for preparing a sustained release composition, in particular for preparing a sustained release composition comprising spermatozoa embedded within an alginate matrix.

BACKGROUND OF THE INVENTION

Artificial insemination (AI) is a technique where spermatozoa are placed into an animal's uterus or cervix by artificial means rather than by natural copulation. The technique has been used since the 1940s and is now widely utilized as a method of mating and in breeding of animals to propagate desirable characteristics, particularly in the case of farm animals such as cattle, swine, sheep, poultry and horses, but also in case of pets such as pedigree dogs, aquatic animals and endangered species.

An overview over the development of modern AI and the challenges of the breeders as regards the use of artificial insemination and preservation of spermatozoa is disclosed in R. H. Foote (2002), American Society of Animal Science (http://www.asas.org/symposia/esupp2/Footehistpdf) and in "Reproduction in farm animals", edited by B. Hafez, E.S.E. Hafez.—7th ed., Philadelphia, Lippincott Williams & Wilkins, 2000.—XIII, ISBN 0-683-30577-8 (ib.).

Spermatozoa are typically collected, extended and then preserved e.g. by cryopreservation. The use of cryopreservation techniques presupposes that the spermatozoa from the specific species of animal tolerate such treatment without resulting in too much deterioration of the spermatozoa quality, viability and fertilization capacity. The spermatozoa are then typically transported to the female's location either cryopreserved or freshly stored, whichever is suitable. It is vital that the spermatozoa are maintained viable until the time of insemination and for a sufficient period of time inside the female animal after insemination until the egg cell(s) reach the location of fertilization.

There has been a lot of focus and research for preservation methods aiming at providing storage methods and means which ensure that the spermatozoa maintain the fertilizing capacity for a longer period of time after collection and till the point of insemination, and in particular preservation methods aiming at providing methods and means which ensure that the spermatozoa maintain the fertilizing capacity for a longer period of time after insemination.

WO2008/004890 discloses a preservation system where spermatozoa are embedded in alginate. The preservation system is said to provide benefits i.a. by giving the spermatozoa fertilizing capacity for a longer period of time after insemination.

PCT/EP2017/081128 teaches a preservation system where spermatozoa are embedded in an improved alginate matrix. The improved alginate matrix is i.a. said to ensure that spermatozoa with high fertilizing potential is released for a prolonged period of time and thus making the time of insemination relative to ovulation even less critical.

Even though the above preservation systems make the breeder less dependent on meeting the most preferable insemination point in time in respect of ovulation, trained personnel are required for the production. Thus, there is a need for means which simplifies the production procedure of the above preservation systems.

To the best of our knowledge, there has not been a lot of research focused on means for simplifying the production procedure of such preservation systems. However, means for producing other preservation systems and systems related thereto have previously been disclosed.

Alginate 3d Cell Culture Kit", 16 Dec. 2012, pages 1-10 discloses a kit comprising at least a first and a second container. The first container comprises a sodium alginate solution and the second container comprises a calcium chloride (active crosslinker) solution. Calcium chloride will dissociate in a solution of sodium alginate. The free calcium ions will interact with sodium alginate thereby forming crosslinked alginate WO2015/181496 teaches a method of producing an alginate-spermatozoa system suitable for use in artificial insemination of animals. The alginate-spermatozoa system comprises an insemination straw. This straw is conventionally formed by a thin tube and by a stopper inserted in the thin tube. In the filled state, the stopper is arranged close to a first end of the tube and the dose of liquid-based substance, in particular spermatozoa dissolved in alginate, is arranged in the straw between the stopper and the second end of the tube. In order to fill the straw, the first end of the tube, close to the stopper, is placed in communication with a vacuum source, while the second end is placed in communication with a vessel containing the substance to be introduced into the straw. The air initially contained between the stopper and the second end is sucked through the stopper while the substance moves forward into the tube unto it reaches the stopper, which it cannot pass because the stopper becomes liquid-tight. In order to avoid that spermatozoa are absorbed in the stopper, it is suggested that the stopper is impregnated with a calcium- or barium salt. It is required that the calcium- and barium salt are water soluble (active crosslinker). When the alginate solution comes in contact with the calcium or barium salt, the alginate is immediately transformed into a gel. The alginate plug ensures that spermatozoa are not absorbed into the stopper.

SUMMARY OF THE INVENTION

A first aspect of the present invention relates to a kit suitable for preparing a sustained release composition, the kit comprising a first container and a second container; the first container comprising an activator composition and either a first diffusion barrier or a second diffusion barrier; the second container comprising an ionically crosslinkable biocompatible polymer, an inactive crosslinker and optionally a material to be released; wherein
  the first container comprises the first diffusion barrier; the activator composition in admixture with the first diffusion barrier is coated on the inner surface of the first container; or
  the first container comprises the first diffusion barrier; the activator composition and the first diffusion barrier are coated on the inner surface of the first container in separate layers thereby forming an inner surface layer and an intermediate layer, the intermediate layer comprising the activator composition; or the first container comprises the second diffusion barrier and is made from a first polymer material; i) the activator composition, ii) the activator composition embedded or encapsulated within a second polymer material, or iii) a mixture of i) and ii) being extruded into the first polymer material during production of the first container; the second diffusion barrier being the first polymer, the second polymer or a combination thereof; or the first container comprises the second diffusion barrier and is made from a first polymer material; a third polymer material in admixture with i) the activator composition, ii) the activator composition embedded or encapsulated within a second polymer material, or iii) a mixture of i) and ii) being co-extruded with the first polymer material during production of the first container thereby forming an inner surface layer and an outer surface layer, the inner surface layer comprising the activator composition; and the second diffusion barrier being the second polymer, the third polymer or a combination thereof.

A second aspect of the present invention relates to a kit suitable for preparing a sustained release composition, the kit comprising a first container and a second container; the first container comprising an inactive crosslinker and either a first diffusion barrier or a second diffusion barrier; the second container comprising an ionically crosslinkable biocompatible polymer, an activator composition and optionally a material to be released; wherein the first container comprises the first diffusion barrier; the inactive crosslinker in admixture with the first diffusion barrier is coated on the inner surface of the first container; or the first container comprises the first diffusion barrier; the inactive crosslinker and the first diffusion barrier are coated on the inner surface of the first container in separate layers thereby forming an inner surface layer and an intermediate layer, the intermediate layer comprising the inactive crosslinker; or the first container comprises the second diffusion barrier and is made from a first polymer material; i) the inactive crosslinker, ii) the inactive crosslinker embedded or encapsulated within a second polymer material, or iii) a mixture of i) and ii) being extruded into the first polymer material during production of the first container; the second diffusion barrier being the first polymer, the second polymer or a combination thereof; or the first container comprises the second diffusion barrier and is made from a first polymer material; a third polymer material in admixture with i) the inactive crosslinker, ii) the inactive crosslinker embedded or encapsulated within a second polymer material, or iii) a mixture of i) and ii) being co-extruded with the first polymer material during production of the first container thereby forming an inner surface layer and an outer surface layer, the inner surface layer comprising the inactive crosslinker; and the second diffusion barrier being the second polymer, the third polymer or a combination thereof.

A third aspect of the present invention relates to a kit suitable for preparing a sustained release composition, the kit comprising a first container and a second container; the first container comprising an active crosslinker and either a first diffusion barrier or a second diffusion barrier; the second container comprising an ionically crosslinkable biocompatible polymer and optionally a material to be released; wherein the first container comprises the first diffusion barrier; the active crosslinker in admixture with the first diffusion barrier is coated on the inner surface of the first container; or the first container comprises the first diffusion barrier; the active crosslinker and the first diffusion barrier are coated on the inner surface of the first container in separate layers thereby forming an inner surface layer and an intermediate layer, the intermediate layer comprising the active crosslinker; or the first container comprises the second diffusion barrier and is made from a first polymer material; i) the active crosslinker, ii) the active crosslinker embedded or encapsulated within a second polymer material, or iii) a mixture of i) and ii) being extruded into the first polymer material during production of the first container; the second diffusion barrier being the first polymer, the second polymer or a combination thereof; or the first container comprises the second diffusion barrier and is made from a first polymer material; a third polymer material in admixture with i) the active crosslinker, ii) the active crosslinker embedded or encapsulated within a second polymer material, or iii) a mixture of i) and ii) being co-extruded with the first polymer material during production of the first container thereby forming an inner surface layer and an outer surface layer, the inner surface layer comprising the active crosslinker; and the second diffusion barrier being the second polymer, the third polymer or a combination thereof.

In one embodiment according to the first, second or third aspect of the present invention, the ionically crosslinkable biocompatible polymer is a divalent cation crosslinkable biocompatible polymer.

In another embodiment according to the first, second or third aspect of the present invention, the ionically crosslinkable biocompatible polymer is ionically crosslinkable alginate. The alginate preferably having more guluronic acid residues than mannuronic acid residues.

In a further embodiment according to the first, second or third aspect of the present invention, the material to be released is selected from the group consisting of biological material, such as cells and in particular stem cells, therapeutic agents, diagnostic agents or any mixture thereof. In a particularly preferred embodiment, the material to be released is spermatozoa.

In yet another embodiment according to the first, second or third aspect of the present invention, the first container is a container for insemination dose, such as an insemination straw or an insemination tube, more preferably an insemination straw. One example of an insemination straw is depicted in FIG. 1. The dimensions of a typical insemination straw is indicated in example 4.

In one embodiment, the first container and/or second container has the shape of a tube with an inner diameter of less than 10 cm, such as less than 5 cm, less than 3 cm, less than 2 cm, less than 1cm, less than 8 mm, less than 5 mm or less than 4 mm.

In one embodiment, the first container and/or second container has the shape of a tube with an inner diameter in the range 0.1 to 10 cm, such as 0.1 to 5 cm, 0.1 to 3 cm, 0.1 to 1 cm or 0.1 to 0.5 cm.

In yet a further embodiment according to the first, second or third aspect of the present invention, the first container is an insemination straw and the insemination straw comprises a tube (1) extending between a first end (2) and a second end (3) and comprising a gas-permeable, liquid-tight plug (4), said plug being arranged in the tube in the vicinity of the first end of same and extending between a first end turned towards the first end of the tube (2) and a second end turned towards the second end of the tube (3).

In another embodiment according to the first, second or third aspect of the present invention, the first container and/or the second container are preferably of a size and form which allows the ionically crosslinkable biocompatible polymer to come into contact with the active crosslinker throughout the first container and/or the second container thereby ensuring that there is crosslinked biocompatible polymer throughout the first container and/or the second container. It is preferred that it is possible to crosslink the ionically crosslinkable biocompatible polymer throughout the first container and/or the second container within a reasonable amount of time. In one embodiment, a reasonable amount of time is less than 48 hours, less than 24 hours, less than 12 hours, less than 6 hours, less than 4 hours, less than 2 hour or less than 1 hour.

In another embodiment according to the first, second or third aspect of the present invention, the first container and/or the second container are suitable for preparing a sustained release composition. In yet another embodiment according to the first, second or third aspect of the present invention, the first container and/or the second container are suitable for preparing a sustained release composition, the sustained release composition being suitable for use in the breeding of animals and/or for implanting biological material into the human or animal body. In another embodiment according to the first, second or third aspect of the present invention, the first container and/or the second container are of suitable size and/or form for preparing a sustained release composition. The sustained release composition being suitable for use in the breeding of animals, for implanting biological material into the human or animal body, for culturing cells, for preservation of biological material and/or for cryopreservation of biological material.

Preservation of biological material may e.g. be a process where organelles, cells, tissues, extracellular matrix, organs, or any other biological constructs susceptible to damage caused by unregulated chemical kinetics are preserved by cooling to low temperatures; typically a temperature≤0° C., such as a temperature≤−5° C., e.g. a temperature≤−10° C., a temperature≤−20° C., a temperature≤−30° C., a temperature≤−40° C., a temperature≤−50° C., a temperature≤−60° C. or a temperature≤−70° C.

Cryo-preservation or cryo-conservation is a process where organelles, cells, tissues, extracellular matrix, organs, or any other biological constructs susceptible to damage caused by unregulated chemical kinetics are preserved by cooling to very low temperatures; typically −80° C. using e.g. solid carbon dioxide or −196° C. using e.g. liquid nitrogen.

In another embodiment according to the first, second or third aspect of the present invention, the first and/or second diffusion barrier is a hydratable diffusion barrier.

Preferably, the first polymer material is not a hydratable diffusion barrier.

In yet another embodiment according to the first, second or third aspect of the present invention, the first and/or second diffusion barrier is a film-forming polymer. Preferably, the first polymer material is not a film-forming polymer.

In a further embodiment according to the first or second aspect of the present invention, the first and/or second diffusion barrier allows the activator composition and the inactive crosslinker to come in contact with each other at a delayed rate thereby ensuring delayed and sustained release of active crosslinker.

In yet a further embodiment according to the first, second or third aspect of the present invention, the first and/or second diffusion barrier allows delayed and sustained release of active crosslinker.

In one embodiment according to the first, second or third aspect of the present invention, the first diffusion barrier is selected from the group consisting of i) natural polymers such as alginate, other polysaccharides like dextran, starch and agarose, cellulose derivatives as CMC (Carboxy Methyl Cellulose), methylcellulose and ethylcellulose, hydroxyethylcellulose, hydroxypropylcellulose and hydroxypropylmethylcellulose, proteins like gelatin, collagen, casein, shellac; ii) synthetic polymers or copolymers like PVA (polyvinyl alcohol), water soluble polyamides, polyacrylic acid and polyacrylic acid anhydride, poly methacrylic acid, polymethacrylic acid anhydride, poly hydroxyethyl methacrylate, polyacrylamide, polyethylene glycol, poly-n-isopropylacrylamide, polyvinylpyrrolidone; or iii) any mixture thereof. It is preferred that the first diffusion barrier is hydrophilic.

In another embodiment according to the first or second aspect of the present invention, a mixture of the activator composition with the inactive crosslinker results in formation of active crosslinker, the active crosslinker being suitable for crosslinking the ionically crosslinkable biocompatible polymer.

In yet another embodiment according to the third aspect of the present invention, the active crosslinker is suitable for crosslinking the ionically crosslinkable biocompatible polymer.

In a further embodiment according to the first or second aspect of the present invention, the inactive crosslinker is a divalent cation salt which is insoluble in water, such as a divalent cation carbonate, more preferably $CaCO_3$, $BaCO_3$ or any mixture thereof.

In yet another embodiment according to the third aspect of the present invention, the active crosslinker is a divalent cation salt which is soluble in water, such as a divalent cation chloride, a divalent cation acetate, a divalent cation citrate, preferably $CaCl_2$, $BaCl_2$, $Ca(CH_3COO)_2$, $Ba(CH_3COO)_2$, calcium citrate, barium citrate or any mixture thereof, and more preferably $CaCl_2$, $Ca(CH_3COO)_2$, calcium citrate or any mixture thereof.

In a further embodiment according to the first or second aspect of the present invention, the activator composition comprises at least one compound capable of transforming the inactive crosslinker into an active crosslinker; the active crosslinker being suitable for crosslinking the ionically crosslinkable biocompatible polymer.

In another embodiment according to the first or second aspect of the present invention, the activator composition comprises a proton donor, such as an acid, and the inactive crosslinker is a compound which releases ions suitable for crosslinking the ionically crosslinkable biocompatible polymer upon contact with the proton donor. In a preferred embodiment, the proton donor is soluble in water. In another preferred embodiment, the proton donor is selected from the group consisting of i) organic acids, such as ascorbic acid, citric acid or any mixture thereof; ii) inorganic acids, such as phosphoric acid, hydrochloric acid or any mixture thereof; or iii) a mixture of an organic acid and an inorganic acid.

In yet another embodiment according to the first or second aspect of the present invention, the activator composition comprises a compound which upon contact with water is converted into a proton donor, such as an acid. In a preferred embodiment, the compound which upon contact with water is transformed into a proton donor is selected from the group consisting of inorganic acid anhydrides, organic acid anhydrides, such as succinic anhydride, and lactones such as glucono deltalactone or any mixture thereof; preferably organic acids anhydrides and glucono deltalactone; and more preferably glucono deltalactone and/or succinic anhydride.

In those embodiments where i) the activator composition comprises a proton donor or a compound that is transformed into a proton donor upon contact with water; and ii) the first and/or second diffusion barrier is not compatible with strong acids; the proton donor, including any proton donors formed when a given compound is brought into contact with water, is preferably a proton donor with a pKa>3. Ascorbic acid or glucuronic acid being examples of weak acids with a pKa>3. The cellulose type of polymers such as CMC (Carboxy Methyl Cellulose), Benecel MP 812 W (methylcellulose and hydroxypropylmethylcellulose) and Methocel K100 (methyl cellulose and hydroxypropyl methylcellulose-hypromellose) are examples of diffusion barriers that are not compatible with strong acids like hydrochloric acid. If such barriers come in contact with strong acids there is a risk that the strong acids may react with the cellulose type polymers and lead to degradation of the polymer matrix and/or crosslinking. Thus, in one embodiment the proton donor has a pKa>3.

In yet another embodiment according to the first or second aspect of the present invention, the activator composition comprises either a hydrolase or a substrate being hydrolysable by the hydrolase. If the activator composition comprises a hydrolase, the container originally not containing the hydrolase further comprises a substrate being hydrolysable by the hydrolase. If the activator composition comprises a substrate being hydrolysable by the hydrolase, the container originally not containing the substrate being hydrolysable by the hydrolase further comprises a the hydrolase. In a further embodiment according to the first or second aspect of the present invention, the first and/or second diffusion barrier is the activator composition. In a preferred embodiment, the first and/or second diffusion barrier is a proton donor, such as an acid, or is transformed into a proton donor upon contact with water. In a more preferred embodiment, the first and/or second diffusion barrier is selected from the group consisting of polyalkyl cyanoacrylate, polyacrylic acid, polymethacrylic acid, poly acrylic acid anhydride, poly methacrylic acid anhydride or any mixture thereof.

In another embodiment according to the first, second or third aspect of the present invention, the first polymer material is selected from the group consisting of polypropylene, preferably of medical grade, polyethylene, polystyrene, polyvinyl chloride, ABS (acrylonitrile-butadiene-styrene), polyamide, polyethylene terephthalate, acetal, acrylics, polycarbonate, EVA (ethylene-vinyl acetate), polyurethanes, a thermoplastics elastomer, blends of polypropylene with polyolefin elastomers, such as EOC (ethylene octene grades), EPR (ethylene propylene rubber), or blends of such polymers.

In yet another embodiment according to the first, second or third aspect of the present invention, the second diffusion barrier should be compatible with extrusion.

In yet another embodiment according to the first, second or third aspect of the present invention, the first- and second diffusion barrier is same or different; with the proviso that the second diffusion barrier is compatible with extrusion.

In yet another embodiment according to the first, second or third aspect of the present invention, the first-, second, and third polymer material may be same or different; with the proviso that the second and third polymer material are compatible with extrusion. It is to be understood that for those embodiments where the first polymer material is subjected to extrusion, also the first polymer material should be compatible with extrusion.

A fourth aspect of the present invention relates to use of the kit according to any one of the first, second or third aspect of the present invention for preparing a sustained release composition.

In one embodiment according to the fourth aspect of the present invention, the sustained release composition is to be used in the breeding of animals.

DEFINITIONS

Figure 1:
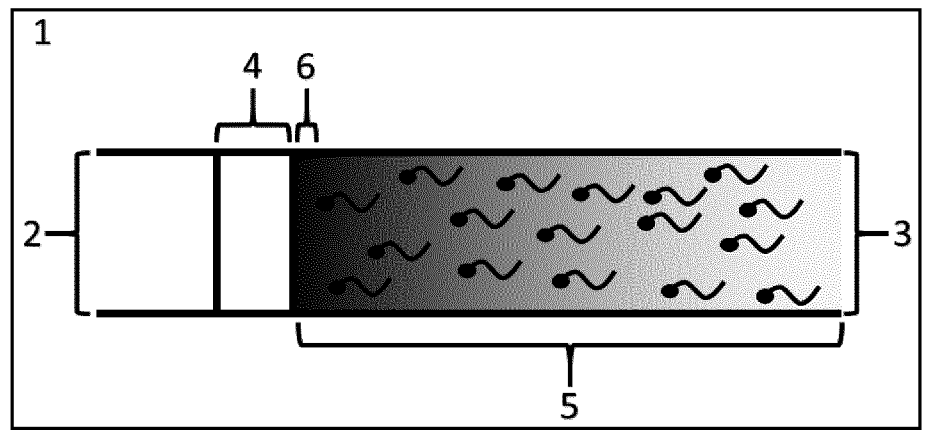
FIG. 1 illustrates an insemination straw (1) comprising a tube extending between a first end (2) and a second end (3) and comprising a gas-permeable, liquid-tight plug (4), said plug being arranged in the tube in the vicinity of the first end of same and extending between a first end turned towards the first end of the tube (2) and a second end turned towards the second end of the tube (3). A mixture of $CaCO_3$ and GDL in solid form (6) is positioned in the vicinity of the end of the gas-permeable, liquid-tight plug (4) facing the second end of the tube (3). A mixture comprising spermatozoa and alginate is introduced into the straw (5) thereby forming an ionically crosslinked polymer with embedded spermatozoa.
Figure 2:
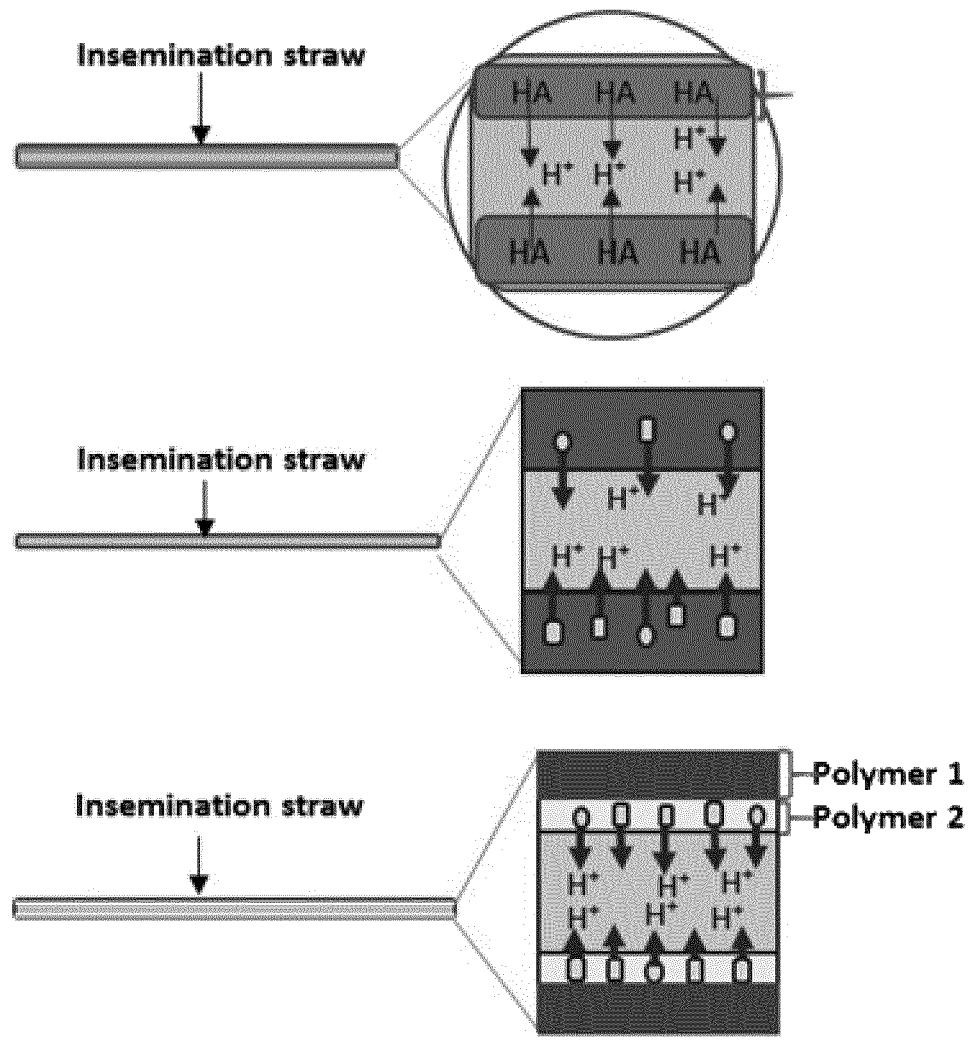
FIG. 2 illustrates various embodiments of the present invention. Upper illustration shows activator composition in a polymer film, i.e. diffusion barrier, on the inside of an insemination straw. Middle illustration shows activator composition being extruded into the polymer material in the insemination straw, the polymer material acting as the diffusion barrier. Lower illustration shows a situation where activator composition in polymer 2 is coextruded with polymer 1 during production of the first container thereby forming a two-layered structure.

The term "activator composition" refers to a composition comprising one or more compounds capable of activating the inactive crosslinker. When the inactive crosslinker is activated, ions suitable for crosslinking the ionically crosslinkable biocompatible polymer will be released from the activated crosslinker.

The term "active crosslinker" refers to a compound that is suitable for crosslinking the ionically crosslinkable biocompatible polymer. Said in other words, if the "active crosslinker" is mixed with a sodium alginate solution at neutral pH, ionically crosslinked alginate is formed. The active crosslinker is typically a compound which release ions when brought in contact with water; the ions being suitable for crosslinking the ionically crosslinkable biocompatible polymer. Thus, $CaCl_2$ and $BaCl_2$ are examples of active crosslinkers according to the definition provided herein, while $CaCO_3$ and $BaCO_3$ are examples of inactive crosslinkers.

The term "biocompatible polymer" refers to a polymer which has the capability of coexisting with living tissues or organisms without causing harm, i.e. a polymer that may be introduced into a host without negatively affecting the host, preferably without negatively affecting the host in any manner.

The term "coated" as used herein refers to a covering, e.g. a diffusion barrier, that is applied to the surface of a substrate, e.g. inner surface of an insemination straw or an insemination tube. The coating itself may be an all-over coating, completely covering the substrate, or it may only cover parts of the substrate.

The term "coextrusion" as used herein typically refers to extrusion of multiple layers of material simultaneously. This type of extrusion utilizes two or more extruders to melt and deliver a steady volumetric throughput of different viscous plastics to a single extrusion head (die) which will extrude the materials in the desired form. The layer thicknesses are typically controlled by the relative speeds and sizes of the individual extruders delivering the materials.

The term "compatible with extrusion" refers to the capability of retaining its properties even after having been subjected to higher temperatures.

The term "diffusion barrier" as used herein refers to a barrier which is permeable to active crosslinker, inactive crosslinker and/or activator composition; in particular upon contact with a liquid solution, such as a water containing solution. The diffusion barrier is permeable to said compounds, but the rate of movement across the barrier is lower than what would have been achieved by free flow thereby providing delayed rate of movement across the barrier. In many real-world scenarios, a single polymer cannot meet all the demands of an application.

Compound extrusion allows a blended material to be extruded, but coextrusion retains the separate materials as different layers in the extruded product, allowing appropriate placement of materials with differing properties such as oxygen permeability, strength, stiffness, and wear resistance.

The term "embedded" as used herein means that the embedded material is prevented from having its natural possibility of movement, i.e. prevented from having its natural possibility of movement that the material otherwise would have if it was stored in liquid, such as in a liquid core of a capsule. The degree of immobilization will vary depending on the characteristics of the matrix, such as e.g. mechanical strength. The embedded material may be e.g. spermatozoa embedded within an ionically crosslinked polymer, such as ionically crosslinked alginate; activator composition embedded within a second polymer material; active crosslinker embedded within a second polymer material; and/or inactive crosslinker embedded within a second polymer material.

The term "encapsulated" as used herein means that the encapsulated material retains its natural possibility of movement, i.e. that the material is stored in a liquid core of a capsule.

The term "extruded" as used herein typically refers to a process used to create objects of a fixed cross-sectional profile by pushing the material through a die of desired cross-section, e.g. the profile of an insemination straw or an insemination tube. If the material to be extruded is some kind of polymer resin, the polymer resin is typically heated to molten state by a combination of heating elements and shear heating from the extrusion screw. The screw, or screws as the case with twin screw extrusion, forces the resin through a die, forming the resin into the desired shape. The extrudate is cooled and solidified as it is pulled through the die or water tank. Extrusion may be continuous (theoretically producing indefinitely long material) or semi-continuous (producing many pieces). Commonly extruded materials include metals, polymers, ceramics, concrete, modelling clay, and foodstuffs. The products of extrusion are generally called "extrudates".

The term "hydrolase" as used herein is meant to encompass a hydrolase enabling the production of $H_3O^+$ when mixing a solution comprising substrate(s) being hydrolysable by the hydrolase with another solution comprising the hydrolase. According to one embodiment of the invention, the hydrolase is a lipase. According to yet another embodiment of the present invention, the lipase is an acylhydrolase, more preferably a triacylglycerol lipase, such as for example the triacylglycerol lipase isolated from the yeast *Candida rugosa*. A suitable lipase is available from Sigma-Aldrich Co. LLC (L1754-Type VII or L3001 Type I, CAS number 9001-62-1).

The term "inactive crosslinker" refers to a compound that requires activation by an activator composition in order to be able to release ions, the ions being suitable for crosslinking the ionically crosslinkable biocompatible polymer. If the inactive crosslinker is not activated by an activator composition, the inactive crosslinker is not able to release ions suitable for crosslinking the ionically crosslinkable biocompatible polymer. Said in other words, if the "inactive crosslinker" e.g. is mixed with a sodium alginate solution at neutral pH in the absence of an activator composition, ionically crosslinked alginate is not formed. However, if the "inactive crosslinker" e.g. is mixed with a sodium alginate solution in the presence of an activator composition, ionically crosslinked alginate will be formed. The inactive crosslinker is typically a compound which does not release ions when brought in contact with water at 25° C., pH>8; the ions being suitable for crosslinking the ionically crosslinkable biocompatible polymer. Thus, $CaCl_2$ and $BaCl_2$ are not inactive crosslinkers according to the definition provided herein, while $CaCO_3$ and $BaCO_3$ are examples of inactive crosslinkers.

The term "ionically crosslinkable biocompatible polymer" refers to a polymer whose linear or branched macromolecules may be linked to one another by way of ionic bonds to form three-dimensional polymer networks. Once the ionically crosslinkable biocompatible polymers are linked to one another by way of ionic bonds, the polymer is referred to as an ionically crosslinked biocompatible polymer.

The term "matrix" as used herein refers to the matrix into which the material to be released is embedded. The matrix provides for reduced possibility of movement, and the degree of immobilization will typically vary depending on the characteristics of the matrix, such as e.g. mechanical strength. However, not only the degree of immobilization but also the dissolution rate of the matrix will typically vary depending on the characteristics of the matrix. A matrix with high degree of crosslinking will typically have higher mechanical strength and therefore lower dissolution rate than a matrix with low degree of crosslinking. Thus, by combining two matrixes with distinct mechanical strength, the combined matrix will have two sections with distinct mechanical strength. Since high mechanical strength is associated with low dissolution rate and low mechanical strength is associated with high dissolution rate, the two sections will have distinct dissolution rates.

The term "mechanical strength" as used herein is measured according to the method described in example 2. Two sections are considered to have distinct mechanical strength if the mechanical strength of one of the sections is significantly different from the mechanical strength of the other section as measured by the method described in example 2. In one embodiment, two sections are considered to have distinct mechanical strength if the mechanical strength of the first section: the mechanical strength of the second section ratio is not equal to 1.

The term "spermatozoa" as used herein includes spermatozoa as such and also spermatozoa contained in seminal fluid. i.e., semen may be used directly when forming the sustained release composition. However, spermatozoa isolated from the seminal fluid, optionally contained in other suitable storage solutions, may also be used to form the sustained release composition.

The term "sustained release" is taken to encompass controlled release, prolonged release, timed release, retarded release, extended release and delayed release.

DETAILED DESCRIPTION OF THE INVENTION

Unless specifically defined herein, all technical and scientific terms used have the same meaning as commonly understood by a skilled artisan in the fields of polymer engineering, biochemistry, molecular biology, and animal breeding.

Where a numerical limit or range is stated herein, the endpoints are included. Also, all values and sub ranges within a numerical limit or range are specifically included as if explicitly written out.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will prevail.

It has previously been shown that embedding spermatozoa in an alginate matrix provides benefits by giving the spermatozoa fertilizing capacity for a longer period of time after insemination (WO2008/004890). It has been assumed that the embedding results in immobilization of the spermatozoa within the alginate matrix, and that the restricted movement results in reduced energy consumption by the spermatozoa which is beneficial as regards shelf life and fertilization capacity.

Based on the above, it seems reasonable to assume that the degree of immobilization would influence the energy consumption by the spermatozoa, and thereby their shelf life and fertilization capacity. Since the degree of immobilization will typically vary depending on the characteristics of the matrix, such as e.g. mechanical strength, such characteristics would be expected to have a direct effect on shelf life and fertilization capacity.

A crosslinked polymer, such as an ionically crosslinked polymer and ionically crosslinked alginate in particular, with low degree of crosslinking will have reduced mechanical strength compared to an ionically crosslinked polymer with high degree of crosslinking. Such a matrix would have fewer constraints within the matrix and allow for higher degree of movement, which in view of the above would be expected to be unfavorable as regards shelf life and fertilization capacity.

The author of PCT/EP2017/081128 surprisingly showed that the mechanical strength of the matrix may be significantly reduced without negatively affecting shelf life and fertilization capacity of the embedded spermatozoa. Since the mechanical strength is directly linked to the dissolution rate of the matrix, this finding rendered it possible to adjust the dissolution profile of the matrix without negatively affecting shelf life and fertilization capacity of the embedded spermatozoa.

By being able to adjust the dissolution profile without negatively affecting shelf life and fertilization capacity, a system may be designed where spermatozoa are continuously released from the polymeric matrix for a prolonged period after insemination. Since shelf life and fertilization capacity is maintained while being embedded within the polymeric matrix, the continuous release ensures that there are high quality spermatozoa available for fertilization for a prolonged period after insemination thus making the time of insemination relative to ovulation less critical.

However, even though both of the above preservation systems make the breeder less dependent on meeting the most preferable insemination point in time in respect of ovulation, the procedures for preparing the preservation systems are complicated and often require trained personnel in order to achieve the desired result. Thus, there is a need for means which simplifies the production procedure of the above preservation systems.

The above need has been solved by providing a kit suitable for preparing a sustained release composition. The kit is easy to use, does not require trained personnel, ensures controlled gelation of polymer matrix, in particular alginate, and provides a sustained release composition where the spermatozoa are evenly distributed throughout the polymer matrix.

It is to be understood that even though the present invention was designed for simplified preparation of sustained release compositions intended to be used in artificial insemination, i.e. in breeding of animals, the inventive concept may also find other fields of utilization. Examples of other fields of utilization may be simplified preparation of sustained release compositions intended to be used in the administration of therapeutic agents, administration of diagnostic agents or administration of biological materials such as cells and in particular stem cells.

Thus, a first aspect of the present invention relates to a kit suitable for preparing a sustained release composition, the kit comprising a first container and a second container; the first container comprising an activator composition and either a first diffusion barrier or a second diffusion barrier; the second container comprising an ionically crosslinkable biocompatible polymer, an inactive crosslinker and optionally a material to be released; wherein the first container comprises the first diffusion barrier; the activator composition in admixture with the first diffusion barrier is coated on the inner surface of the first container; or the first container comprises the first diffusion barrier; the activator composition and the first diffusion barrier are coated on the inner surface of the first container in separate layers thereby forming an inner surface layer and an intermediate layer, the intermediate layer comprising the activator composition; or the first container comprises the second diffusion barrier and is made from a first polymer material; i) the activator composition, ii) the activator composition embedded or encapsulated within a second polymer material, or iii) a mixture of i) and ii) being extruded into the first polymer material during production of the first container; the second diffusion barrier being the first polymer, the second polymer or a combination thereof; or the first container comprises the second diffusion barrier and is made from a first polymer material; a third polymer material in admixture with i) the activator composition, ii) the activator composition embedded or encapsulated within a second polymer material, or iii) a mixture of i) and ii) being co-extruded with the first polymer material during production of the first container thereby forming an inner surface layer and an outer surface layer, the inner surface layer comprising the activator composition; and the second diffusion barrier being the second polymer, the third polymer or a combination thereof.

A second aspect of the present invention relates to a kit suitable for preparing a sustained release composition, the kit comprising a first container and a second container; the first container comprising an inactive crosslinker and either a first diffusion barrier or a second diffusion barrier; the second container comprising an ionically crosslinkable biocompatible polymer, an activator composition and optionally a material to be released; wherein the first container comprises the first diffusion barrier; the inactive crosslinker in admixture with the first diffusion barrier is coated on the inner surface of the first container; or the first container comprises the first diffusion barrier; the inactive crosslinker and the first diffusion barrier are coated on the inner surface of the first container in separate layers thereby forming an inner surface layer and an intermediate layer, the intermediate layer comprising the inactive crosslinker; or the first container comprises the second diffusion barrier and is made from a first polymer material; i) the inactive crosslinker, ii) the inactive crosslinker embedded or encapsulated within a second polymer material, or iii) a mixture of i) and ii) being extruded into the first polymer material during production of the first container; the second diffusion barrier being the first polymer, the second polymer or a combination thereof; or the first container comprises the second diffusion barrier and is made from a first polymer material; a third polymer material in admixture with i) the inactive crosslinker, ii) the inactive crosslinker embedded or encapsulated within a second polymer material, or iii) a mixture of i) and ii) being co-extruded with the first polymer material during production of the first container thereby forming an inner surface layer and an outer surface layer, the inner surface layer comprising the inactive crosslinker; and the second diffusion barrier being the second polymer, the third polymer or a combination thereof.

A third aspect of the present invention relates to a kit suitable for preparing a sustained release composition, the kit comprising a first container and a second container; the first container comprising an active crosslinker and either a first diffusion barrier or a second diffusion barrier; the second container comprising an ionically crosslinkable biocompatible polymer and optionally a material to be released; wherein the first container comprises the first diffusion barrier; the active crosslinker in admixture with the first diffusion barrier is coated on the inner surface of the first container; or the first container comprises the first diffusion barrier; the active crosslinker and the first diffusion barrier are coated on the inner surface of the first container in separate layers thereby forming an inner surface layer and an intermediate layer, the intermediate layer comprising the active crosslinker; or the first container comprises the second diffusion barrier and is made from a first polymer material; i) the active crosslinker, ii) the active crosslinker embedded or encapsulated within a second polymer material, or iii) a mixture of i) and ii) being extruded into the first polymer material during production of the first container; the second diffusion barrier being the first polymer, the second polymer or a combination thereof; or the first container comprises the second diffusion barrier and is made from a first polymer material; a third polymer material in admixture with i) the active crosslinker, ii) the active crosslinker embedded or encapsulated within a second polymer material, or iii) a mixture of i) and ii) being co-extruded with the first polymer material during production of the first container thereby forming an inner surface layer and an outer surface layer, the inner surface layer comprising the active crosslinker; and the second diffusion barrier being the second polymer, the third polymer or a combination thereof.

The subject matter of the above listed aspects represents alternative solutions to the same problem in that they all provide delayed and sustained release of active crosslinker. The problem is solved by having a diffusion barrier in combination with a crosslinker, the crosslinker being either an active crosslinker or an inactive crosslinker. The diffusion barrier ensuring delayed and sustained release of active crosslinker.

Sustained Release Composition

The sustained release composition, which may be prepared by the kit according to the present invention, is typically designed to release a material at a predetermined rate in order to ensure continuous supply of the material for a specific period of time and at the same time ensure that non-released material remains preserved within the matrix until the point of release.

In one embodiment, the material to be released is released for a period of at least 2 hours after insemination, such as at least 4 hours after insemination, at least 8 hours after insemination, at least 16 hours after insemination, at least 32 hours after insemination or at least 144 hours after insemination. In another embodiment, the material to be released is released for a period in the range 2-144 hours after insemination, such as 4-120 hours after insemination, 8-96 hours after insemination, 16-72 hours after insemination, 24-96 hours after insemination, 24-120 hours after insemination or 24-144 hours after insemination.

Further, the sustained release composition comprises the material to be released embedded in ionically crosslinked biocompatible polymer, such as ionically crosslinked alginate.

In one embodiment, the ionically crosslinked biocompatible polymer has at least a first and a second section with distinct mechanical strength. The mechanical strength of an ionically crosslinked biocompatible polymer may be measured according to the method described in example 2.

If the sections of the ionically crosslinked biocompatible polymer have distinct mechanical strength, the ionically crosslinked biocompatible polymer may be considered to represent a heterogenous crosslinked biocompatible polymer, i.e. heterogenous with respect to mechanical strength.

If the difference in mechanical strength between the sections is small, the ionically crosslinked alginate will in practice gradually dissolve section by section. However, if the difference in mechanical strength between the sections is high, the ionically crosslinked alginate will typically follow a time-staggered dissolution profile.

The sustained release composition may be divided into a predetermined number of sections. Each of the sections representing part of the sustained release composition. The sections may be of equal or different volumetric size.

The first and second sections with distinct mechanical strength may be of similar or equal volumetric size. The first and second sections with distinct mechanical strength may be positioned adjacent to each other in the sustained release composition or may not be positioned adjacent to each other in the sustained release composition.

Further, the sustained release composition may in principle take any three-dimensional shape such as sphere, torus, cylinder, cone, cube, cuboid, triangular pyramid, square pyramid, triangular prism or any combination thereof.

In another embodiment according to the present invention, the ionically crosslinked biocompatible polymer has at least a first and a second section with similar or equal mechanical strength. The mechanical strength of an ionically crosslinked biocompatible polymer may be measured according to the method described in example 2.

If the sections of the ionically crosslinked biocompatible polymer have equal mechanical strength, the ionically crosslinked biocompatible polymer may be considered to represent a homogenous crosslinked biocompatible polymer, i.e. homogenous with respect to mechanical strength.

In one embodiment according to the present invention, the ionically crosslinked biocompatible polymer is homogenous with respect to mechanical strength.

In another embodiment according to the present invention, the ionically crosslinked biocompatible polymer is heterogenous with respect to mechanical strength.

The sustained release composition may be prepared more easily without the need of trained personnel by using the kit according to the present invention. The kit comprises a first container and a second container.

Ionically Crosslinkable Biocompatible Polymer

The second container comprises an ionically crosslinkable biocompatible polymer, such as ionically crosslinkable alginate. However, it is to be understood that the second container may also contain further crosslinkable biocompatible polymers, whether naturally occurring or synthetic, and whether homopolymers or copolymers. In one embodiment according to the present invention, the second container does not comprise other crosslinkable biocompatible polymers than ionically crosslinkable alginate.

In a further embodiment according to the present invention, the ionically crosslinkable biocompatible polymer is a divalent cation crosslinkable polymer, such as divalent cation crosslinkable alginate.

Alginate is an anionic copolymer of 1,4-linked-β-D-mannuronic acid and α-L-guluronic acid. Various forms of alginate are available commercially. Such forms are typically 60% 1,4-linked-β-D-mannuronic acid and 40% α-L-guluronic acid; or 30% 1,4-linked-β-D-mannuronic acid and 70% α-L-guluronic acid. In one embodiment according to the present invention, the ionically crosslinked polymer is alginate having more guluronic acid residues than mannuronic acid residues. In particular embodiments, the ionically crosslinked polymer is alginate being composed of >50% guluronic acid residues, such as >60% guluronic acid residues, >70% guluronic acid residues or >80% guluronic acid residues. The percentage being calculated based on the total number of residues in the alginate polymer. An ionically crosslinked polymer having 100 guluronic acid residues and 400 mannuronic acid residues is composed of 20% guluronic acid residues and 80% mannuronic acid residues.

In one embodiment according to the present invention, the alginate has more guluronic acid residues than mannuronic acid residues.

Alginates are widely used e.g. in food industry as e.g. stabilizers and for viscosity control, in pharmaceutical and cosmetic industry as e.g. disintegrant. For the various purposes, both alginates being rich in guluronic acid or mannuronic acid, respectively, are available (Mancini et al., (1999), Journal of Food Engineering 39, 369-378) and various methods for producing alginates being rich in guluronic acid are known, cf. WO 8603781, U.S. Pat. Nos. 4,990,601, 5,639,467).

First Container

The first container is typically to be used in cryo-preservation or cryo-conservation of biological material, a process where a biological material susceptible to damage caused by unregulated chemical kinetics (e.g. spermatozoa) is preserved by cooling to very low temperatures (typically −80° C. using solid carbon dioxide or −196° C. using liquid nitrogen). At low enough temperatures, any enzymatic or chemical activity which might cause damage to the biological material in question is effectively stopped. Cryopreservation methods seek to reach low temperatures without causing additional damage caused by the formation of ice crystals during freezing.

Thus, in one embodiment according to the first, second or third aspect of the present invention, the first container is made from a material which is compatible of being subjected to very low temperatures, such as temperatures below −20° C., temperatures below −80° C. or temperatures below −196° C. Examples of such temperatures are −80° C. using solid carbon dioxide or −196° C. using liquid nitrogen. In order for the material to be compatible of being subjected to very low temperatures, the material must retain the shame shape, structure and function during prolonged storage at such low temperatures. It is also important that the first container does not react or otherwise negatively affects the biological material which is to be stored within the first container.

Even though the first container may be used in cryo-preservation or cryo-conservation of biological material, it is to be understood that the first container may also be used for fresh preparations of spermatozoa. If the first container is used for fresh preparations of spermatozoa and does not require cryo-preservation or cryo-conservation, the first container does not need to be made from a material which is compatible of being subjected to very low temperatures but may be made from any material that does not react or otherwise negatively affects the biological material which is to be stored within the first container.

In one preferred embodiment according to the present invention, the first container is a container for insemination dose, such as an insemination straw or an insemination tube. An insemination straw is depicted in FIG. 1. These straws are conventionally formed by a thin tube, having for example an inner diameter of 1.6 or 2.5 mm, and by a plug (4) inserted within the thin tube.

In the filled state, the plug is arranged close to a first end (2) of the tube and the content originally contained within the second container is arranged in the straw between the plug and the second end (3) of the tube. In order to fill the straw, the first end (2) of the tube, close to the plug (4), is typically placed in communication with a vacuum source, while the second end (3) is placed in communication with the second container containing the substance to be introduced into the straw. The air initially contained between the plug and the second end (3) is sucked through the plug (4)

while the substance moves forward into the tube until it reaches the plug (4), which it cannot pass because the plug (4) becomes liquid-tight. If necessary, after filling, the straw is welded close to one or both of its ends and is typically stored cold, such as at a temperature below −80° C. or more preferably at a temperature around −196° C.

In order to empty the straw, if necessary after cutting the welded end portions and thawing, a rod is inserted into the tube via the end closest to the plug (4), until it bears against the plug (4). Using this rod, the plug is made to slide in the manner of a piston towards the end furthest from the plug (4), so that the dose of substance initially contained within the straw is expelled through that end.

Second Container

The second container is not necessarily to be used in cryo-preservation or cryo-conservation of biological material, i.e. is not necessarily subjected to low temperatures such as −80° C. or −196° C., and may therefore be made from the same or different material as the first container. However, it is important that the second container also is made from a material which does not react or otherwise negatively affects the biological material which may be contained within the second container before the content is transferred to the first container.

Material to be Released

In one embodiment according to the present invention, the second container further comprises a material to be released.

In one embodiment according to the present invention, the material to be released is selected from the group consisting of biological material, such as cells and in particular stem cells, therapeutic agents, diagnostic agents or any mixture thereof. In one particularly preferred embodiment according to the present invention, the material to be released is spermatozoa.

Diffusion Barrier(s)

When the kit according to the present invention is used to produce a sustained release composition, the material to be released, e.g. spermatozoa, is typically added to the content of the second container and thereafter the content of the second container is transferred to the first container. The result of that procedure is that one or more of the diffusion barriers of the first container is exposed to water thereby transforming hydratable diffusion barrier(s) into hydrated diffusion barrier (s). The hydrated diffusion barrier(s) preferably being permeable to the activator composition, inactive crosslinker and/or active crosslinker.

Thus, in one embodiment according to the present invention, the first and/or second diffusion barrier is a hydratable diffusion barrier, i.e. that the diffusion barrier becomes hydrated when brought in contact with water. In another embodiment the first and/or second diffusion barrier is a hydratable diffusion barrier with the proviso that the first polymer material is not a hydratable diffusion barrier.

In another embodiment according to the present invention, the first and/or second diffusion barrier is a film-forming polymer. Film-forming polymers are a group of chemicals that leave a pliable, cohesive, and continuous covering over a substrate such as the inner surface of a container. Examples of film-forming polymers being polyvinylpyrrolidone (PVP), acrylates, acrylamides, and various copolymers.

In another embodiment according to the present invention, the first and/or second diffusion barrier is a film-forming polymer with the proviso that the first polymer material is not a film-forming polymer.

In a further embodiment according to the present invention, the first diffusion barrier is selected from the group consisting of i) natural polymers such as alginate, other polysaccharides like dextran, starch and agarose, cellulose derivatives as CMC (Carboxy Methyl Cellulose), methylcellulose and ethylcellulose, hydroxyethylcellulose, hydroxypropylcellulose and hydroxypropylmethylcellulose, proteins like gelatin, collagen, casein, shellac; ii) synthetic polymers or copolymers like PVA (polyvinyl alcohol), watersoluble polyamides, polyacrylic acid and polyacrylic acid anhydride, poly methacrylic acid, polymethacrylic acid anhydride, poly hydroxyethyl methacrylate, polyacrylamide, polyethylene glycol, poly-n-isopropylacrylamide, polyvinylpyrrolidone; or iii) any mixture thereof. It is preferred that the first diffusion barrier is hydrophilic.

In one embodiment according to the present invention, the thickness of the first diffusion barrier is in the range from 50 nm to 100 µm, more preferably in the range 100 nm to 10 µm. Further, the first diffusion barrier should preferably be uniform and as thin as possible.

In order to achieve a successful result, it is preferred that gelation of the ionically crosslinkable biocompatible polymer is controlled, i.e. that it does not form a gel too quickly, and that the material to be released is evenly distributed throughout the sustained release composition, i.e. the ionically crosslinked biocompatible polymer.

In the first, second and third aspect of the present invention, controlled gelation of the ionically crosslinkable biocompatible polymer is achieved by delayed and sustained release of active crosslinker.

In the first and second aspect of the present invention, delayed and sustained release of active crosslinker is achieved by ensuring that the inactive crosslinker is separated from the activator composition by at least one diffusion barrier after the content of the second container has been transferred to the first container. When the activator composition comes in contact with the inactive crosslinker, the inactive crosslinker is transformed into an active crosslinker. The active crosslinker will then together with the ionically crosslinkable biocompatible polymer form ionically crosslinked biocompatible polymer. The rate of gelation may be controlled by regulating the amount of active crosslinker that is available for the ionically crosslinkable biocompatible polymer.

In the third aspect of the present invention, delayed and sustained release of active crosslinker is achieved by ensuring that active crosslinker is separated from the ionically crosslinkable biocompatible polymer by at least one diffusion barrier. When active crosslinker passes the diffusion barrier(s) and comes in contact with the ionically crosslinkable biocompatible polymer, an ionically crosslinked biocompatible polymer is formed. The rate of gelation may be controlled by regulating the amount of active crosslinker that is available for the ionically crosslinkable biocompatible polymer, i.e. by regulating the rate of transport across the diffusion barrier(s).

In yet another embodiment according to the first and second aspect of the present invention, the first and/or second diffusion barrier allows the activator composition and the inactive crosslinker to come in contact with each other at a delayed rate thereby ensuring delayed and sustained release of active crosslinker.

In yet a further embodiment according to the third aspect of the present invention, the first and/or second diffusion barrier allows delayed and sustained release of active crosslinker.

In one embodiment according to the present invention, the activator composition is uniformly distributed within the first and/or second diffusion barrier. Further, phase separation should preferably not occur during drying.

In yet another embodiment according to the first and second aspect of the present invention, a mixture of the activator composition with the inactive crosslinker results in formation of active crosslinker, the active crosslinker being suitable for crosslinking the ionically crosslinkable biocompatible polymer.

Active Crosslinker

The term "active crosslinker" refers to a compound that is suitable for crosslinking the ionically crosslinkable biocompatible polymer. The active crosslinker is typically a compound which release ions when brought in contact with water; the ions being suitable for crosslinking the ionically crosslinkable biocompatible polymer. Compound which release ions when brought in contact with water are typically water soluble, preferably compounds having a solubility in water (25° C., pH=7) higher than 1 g/L, such as higher than 10 g/L or higher than 100 g/L. $CaCl_2$) and $BaCl_2$ have a solubility in water (25° C., pH=7) around 811 g/L and 358 g/L respectively and therefore represents typical examples of active crosslinkers according to the present invention. In contrast, $CaCO_3$ and $BaCO_3$ have a solubility in water (25° C., pH=7) around 0.013 g/L and 0.024 g/L respectively and should therefore not be considered as active crosslinkers as defined herein but rather as inactive crosslinkers.

In one embodiment according to the present invention, the active crosslinker is a divalent cation salt which is soluble in water, such as a divalent cation chloride, a divalent cation acetate, a divalent cation citrate, preferably $CaCl_2$, $BaCl_2$, $Ca(CH_3COO)_2$, $Ba(CH_3COO)_2$, calcium citrate, barium citrate or any mixture thereof, and more preferably $CaCl_2$, $Ca(CH_3COO)_2$, calcium citrate or any mixture thereof.

In another embodiment according to the present invention, neither the first container nor the second container contains any active crosslinkers prior to mixing the content of the second container with the content of the first container.

Inactive Crosslinker—Activator Composition

The term "inactive crosslinker" refers to a compound that requires activation by an activator composition in order to be able to release ions, the ions being suitable for crosslinking the ionically crosslinkable biocompatible polymer. If the inactive crosslinker is not activated by an activator composition, the inactive crosslinker is not able to release ions suitable for crosslinking the ionically crosslinkable biocompatible polymer. The inactive crosslinker is typically a compound which does not release ions when brought in contact with water at 25° C., pH>8; the ions being suitable for crosslinking the ionically crosslinkable biocompatible polymer.

In one embodiment according to the present invention, inactive crosslinker is a compound having solubility in water (25° C., pH=7) lower than 1 g/L, such as lower than 10 g/L or lower than 100 g/L. $CaCl_2$ and $BaCl_2$ have a solubility in water (25° C., pH=7) around 811 g/L and 358 g/L respectively and are therefore not inactive crosslinkers as defined herein. However, $CaCO_3$ and $BaCO_3$ have a solubility in water (25° C., pH=7) around 0.013 g/L and 0.024 g/L respectively and should therefore be considered as inactive crosslinkers as defined herein.

In one embodiment according to the present invention, the inactive crosslinker is a divalent cation salt which is insoluble in water, such as a divalent cation carbonate, more preferably $CaCO_3$, $BaCO_3$ or any mixture thereof.

Inactive crosslinkers like $CaCO_3$ and $BaCO_3$ release ions suitable for crosslinking the ionically crosslinkable biocompatible polymer at an acidic pH. Thus, any compound which may act as a proton donor may be a suitable activator composition for such inactive crosslinkers.

Thus, in one embodiment according to the present invention, the activator composition comprises a proton donor, such as an acid, and the inactive crosslinker is a compound which releases ions suitable for crosslinking the ionically crosslinkable biocompatible polymer upon contact with the proton donor. It is preferred that the proton donor is water soluble.

In a preferred embodiment, the proton donor is selected from the group consisting of i) organic acids, such as ascorbic acid, citric acid or any mixture thereof; ii) inorganic acids, such as phosphoric acid, hydrochloric acid or any mixture thereof; or iii) a mixture of an organic acid and an inorganic acid.

In an alternative embodiment according to the present invention, the activator composition comprises a compound which upon contact with water is transformed into a proton donor, such as an acid. Representative examples of such compounds being inorganic acid anhydrides, organic acids anhydrides and lactones such as glucono deltalactone or any mixture thereof. In a more preferred embodiment, the activator composition is an organic acid anhydride, glucono deltalactone or any mixture thereof; and even more preferably the activator composition comprises glucono deltalactone (glucono-δ-lactone).

Glucono-δ-lactone is a simple sugar which slowly hydrolysis in solution to form gluconic acid. This hydrolysis results in a gradual reduction in solution pH until a point at which e.g. carbonic acid may be formed from a divalent cation carbonate, such as $CaCO_3$ or $BaCO_3$, releasing active ions to induce gelation. The rate of glucono-δ-lactone hydrolysis, and therefore onset of gelation, may be altered by e.g. changing the temperature of the solution. As gelation proceeds at the activated crosslinker—ionically crosslinkable biocompatible polymer contact surface, there will be a reduction in the volume of the crosslinked polymer macromolecules which in turn reduces the effective concentration in the remainder of the polymer solution.

Another example of an activator composition is described in WO2013/076232 which is hereby incorporated by reference in its entirety. The activation system disclosed in said document involves the use of a hydrolase and a substrate being hydrolysable by the hydrolase.

The term "hydrolase" as used herein is meant to encompass a hydrolase enabling the production of H3O+ when mixing a solution comprising substrate(s) with another solution comprising the hydrolase. According to one embodiment of the invention, the hydrolase is a lipase. According to yet another embodiment of the present invention, the lipase is an acylhydrolase, more preferably a triacylglycerol lipase, such as for example the triacylglycerol lipase isolated from the yeast *Candida rugosa*. A suitable lipase is available from Sigma-Aldrich Co. LLC (L1754-Type VII or L3001 Type I, CAS number 9001-62-1).

It is to be understood that any hydrolase resulting in the production of H3O+ upon binding to its substrate may be used according to the present invention. An hydrolase that may be used may thus be selected from the group consisting of carboxylic ester hydrolases, oxaloacetase, glycosidases, ether hydrolases and hydrolases acting on carbon-nitrogen bonds other than peptide bonds in linear amides, such as chitin deacetylase.

Non-limiting examples of carboxylic ester hydrolases are carboxylesterase, triglycerol lipases, acetyl esterase, sterol esterase, L-arabinonolactonase, gluconolactonase, acylglycerol lipase, g-acetylglucose deacetylase, lipoprotein lipase, fatty acyl ethyl ester synthase, poly(3-hydroxybutyrate)depolymerase, and diacylglycerol acylhydrolase. Non-limiting examples of oxaloacetase are fumarylacetoacetase, acylpyruvate hydrolase, and acetylpyruvate hydrolase.

A non-limiting example of a glycosidase is α-glucuronidase. A non-limiting example of a ether hydrolase is isochorismatase.

The substrate for the hydrolase is a substrate which upon binding to the hydrolase results in the production of $H_3O^+$. The substrate may thus vary depending on the type of hydrolase used according to the present invention.

Suitable substrates according to the present invention are esters of organic acids, such as carboxylic acids.

According to one embodiment of the present invention, the substrate is a compound of formula I:

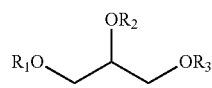

wherein R1, R2, and R3 independently are the same or different and represents a straight or branched, substituted or non-substituted C1-C12 alkyl carbonyl chain, such as e.g. methanone, ethanone, acetone, butanone, pentanone, hexanone, heptanone, octanone, nonanone, decanone, dodecanone etc. According to one embodiment, R1, R2, and R3 are each methanone. According to another embodiment, R1, R2, and R3 are each ethanone. According to yet another embodiment, R1, R2, and R3 is acetone. Substrates of the formula I is in particular useful when using triacylglycerol lipase as the hydrolase according to the present invention. Upon binding to the substrate, said ester of formula I is split into glycerol and a carboxylic acid, i.e. thus providing $H_3O^+$.

The alkyl carbonyl chain may be branched or unbranched. The alkyl carbonyl chain may furthermore be substituted or unsubstituted. The skilled person will acknowledge, based on the teaching herein, that various substrate covered by the formula I may be used and may based on the teaching herein select the proper substrate to be used according to the present invention. The skilled person will thus acknowledge that the alkyl chain length may vary without affecting the ability of the enzyme to produce glycerol and a carboxylic acid of the substrate, thus resulting in the release of $H_3O^+$ ions.

According to a preferred embodiment of the present invention, the substrate is selected from the group triacetin, tripropionin and tributyrin, of the formulas:

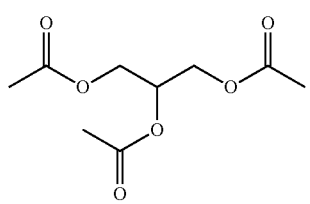
Triacetin

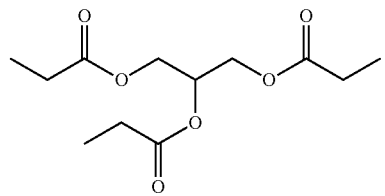
Tripropionin

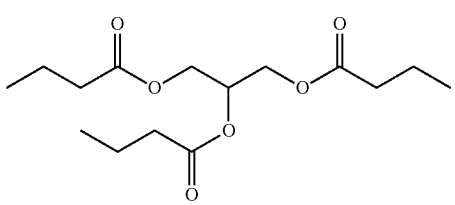
Tributyrin

Thus, according to one embodiment, R1, R2, and R3 represent C1-C4 alkyl carbonyl.

According to yet another embodiment of the present invention, the substrate present is selected from the group consisting of tripropionin and tributyrin.

According to the present invention, the mixing of the hydrolase and the substrate defined above results in the production of $H_3O^+$. Said $H_3O^+$ furthermore result in the release of ions from the inactive crosslinker.

Even though the hydrolase is not directly activating the inactive crosslinker, it may still be considered to represent an activator composition as the hydrolase initiates a series of events resulting in the activation of the inactive crosslinker. Thus, the activator composition may activate the inactive crosslinker directly (e.g. by using a proton donor) or may activate the inactive crosslinker indirectly (e.g. by using a hydrolase and its substrate).

In a preferred embodiment according to the present invention, the activator composition indirectly activates the inactive crosslinker by initiating a series of events resulting in the activation of the inactive crosslinker. One example of such activator composition is a hydrolase which hydrolyzes a substrate resulting in the formation of an acid which in turn interacts with e.g. $CaCO_3$ resulting in the release of free calcium ions from said carbonate salt. Another example of an activator composition which indirectly activates the inactive crosslinker is glucono-δ-lactone which needs to be hydrolyzed into the acid form before being able to activate the inactive crosslinker.

In one embodiment according to the present invention, the hydrolase and its substrate are contained in separate containers prior to mixing the content of the first container with the content of the second container. In another embodiment according to the present invention, the hydrolase and its substrate may be contained in the same container with the proviso that the two compounds are separated by a diffusion barrier, such as e.g. the first diffusion barrier, second diffusion barrier or any mixture thereof.

In one embodiment according to the present invention, the activator composition comprises the hydrolase. In order for the hydrolase to serve its purpose, the substrate being hydrolysable by the hydrolase must be present in either the first and/or second container with the proviso that the substrate is not in contact with the hydrolase before the content of the first container is mixed with the content of the second container.

In another embodiment according to the present invention, the activator composition comprises the substrate being hydrolysable by the hydrolase. In order for the substrate to serve its purpose, the hydrolase must be present in either the first and/or second container with the proviso that the substrate is not in contact with the hydrolase before the content of the first container is mixed with the content of the second container.

In a further embodiment according to the present invention, the first and/or second diffusion barrier may act both as a diffusion barrier and an activator composition. This may be achieved e.g. by selecting a diffusion barrier which is a proton donor, such as an acid, or by selecting a diffusion barrier which is transformed into a proton donor upon contact with a liquid such as water.

Thus, in one embodiment according to the present invention, the first and/or second diffusion barrier is the activator composition.

In another embodiment according to the present invention, the first and/or second diffusion barrier is a proton donor, such as an acid, or is transformed into a proton donor upon contact with water. A diffusion barrier having this property may be selected from the group consisting of polyalkyl cyanoacrylate, polyacrylic acid, polymethacrylic acid, poly acrylic acid anhydride, poly methacrylic acid anhydride or any mixture thereof.

Having generally described this invention, a further understanding can be obtained by reference to the examples, which can be herein for purposes of illustration only, and are provided to be limiting unless otherwise specified.

EXAMPLES

Example 1: Preparation of Bovine Spermatozoa in Alginate Gels within Insemination Straws Materials The following chemicals were used: trizma hydrochloride, EDTA, NaHCO$_3$, NaCl, NaOH, glycerol (>99%) fructose, ascorbic acid and sodium citrate Carboxy Methyl Cellulose (CMC) from Sigma-Aldrich (St. Luis, USA) Poly Vinyl Alcohol (PVA), Selvol 523/Selvol 325 from Sekisui Specialty Chemicals Europe S.L (Tarragona Spain). Glucose anhydrate from Apro (Oslo, Norway). ViCality AlbaFil calcium carbonate from Brenntag Specialties (South Plainfield, USA) and sodium alginate (UP-LVG) from Novamatrix A/S (Drammen, Norway).

Source of Spermatozoa

Bovine spermatozoa were collected at the Geno facilities at Hallsteingård in Trondheim and Store Ree in Stange, Norway.

Buffer Solutions

The following extender solutions were used:

Extender for first dilution of spermatozoa: 1.45 g l$^{-1}$ Trizma hydrochloride glucose, 0.4 g l$^{-1}$ sodium citrate, 1 g l$^{-1}$ fructose, and 200 ml l$^{-1}$ egg yolk. The pH of the solution was adjusted to 6.4 by addition of NaOH.

Extender solution for secondary dilution of spermatozoa: 1 g l$^{-1}$ ViCality Albafil calcium carbonate, 54 g l$^{-1}$ fructose, 170 g l$^{-1}$ glycerol and 10 g l$^{-1}$ UP-LVG sodium alginate. Both extenders contain standard antibiotic cocktail giving at least the final concentration required in EU dir 88/407.

Coating of Insemination Straws:

Insemination straws (type "medium") were coated by flushing with a mixture of 13.6 μmol/mL of ascorbic acid aqueous solution and 3% PVA in water or a mixture of 13.6 μmol/mL of ascorbic acid aqueous solution and 1.5% CMC in water. The straws were dried in vacuum chamber at room temperature after flushing with the coating solutions.

Dilution and Immobilization of Bull Spermatozoa

Bovine spermatozoa were harvested at the Geno facilities. Immediately after harvesting, the spermatozoa were diluted to a concentration of $133 \times 10^6$ cells per ml in the extender solution for first time dilution. The resulting solution containing spermatozoa was then cooled to 4° C. After cooling to 4° C., the solution was mixed with an equal volume of the extender solution for secondary dilution.

The solution containing spermatozoa were then transferred into insemination straws coated with either ascorbic acid and PVA or ascorbic acid and CMC as described above. The insemination straws were kept at 4° C. and the content was checked for gelation and pH after 1, 3, 5 and 24 hours.

Evaluation of Gelation and Gel Strengths and the Motility of the Spermatozoa

An increase in viscosity of the liquid in the straws was observed after 1 hour for both types of coating. After 3 hours a gel was formed within the straws and after 24 hours a firm gel was observed within the straws.

The motility of the spermatozoa was assessed using microscopic evaluation. Prior to measurement of motility, the alginate gel was liquefied in modified IVT solution (3 g l$^{-1}$ glucose, 20 g l$^{-1}$ sodium citrate, 2.1 g l$^{-1}$ NaHCO$_3$, 1.16 g l$^{-1}$ NaCl, 3 g l$^{-1}$ EDTA, pH 7.35) by adding the content of an insemination straw to 0.9 ml of modified IVT solution in an Eppendorf tube and shaking the tube carefully on a tube-tumbler for approximately 10 minutes. The tubes were preheated for minimum 15 minutes in a heat-block at 37° C. prior to microscopic assessment of motility. Approximately 3 μl of the solution was added to a preheated microscope slide and immediately inspected using a light microscope. The number of motile spermatozoa in each sample was estimated to the nearest 5% interval.

Approximately 85% of the spermatozoa were motile when assessed 1 hour after filling of straws with both types of coating and approximately 70% of the spermatozoa were motile for both types of straws after 5 hours. When assessed after 24 hours, approximately 50% of the spermatozoa were motile in straws coated with ascorbic acid and PVA while 60% of the spermatozoa were motile in straws coated with ascorbic acid and CMC.

Example 2: Determination of Mechanical Strength of Different Alginate Gels with Immobilized Sperm Cells Materials The following chemicals were used: trizma hydrochloride, EDTA, D-(+)-Gluconic acid δ-lactone, NaHCO$_3$, NaCl, glycerol (>99%), fructose and sodium citrate from Sigma-Aldrich (St. Louis, USA). Glucose anhydrate from Apro (Oslo, Norway). Eska1500 calcium carbonate from KSL staubtechnik gmbh (Lauingen, Germany) and sodium alginate (UP LVG and UP VLVG) from NovaMatrix, FMC BioPolymer AS (Sandvika, Norway). Standard insemination straw 0.25 ml (French mini straws (IMV, L'Aigle, France)).

Source of Spermatozoa

Bovine spermatozoa were collected at the Geno facilities at Hallsteingård in Trondheim and Store Ree in Stange, Norway.

Buffer Solutions

The following extender solutions were used:

Extender for first dilution of spermatozoa: 1.45 g l$^{-1}$ Trizma hydrochloride glucose, 0.4 g l$^{-1}$ sodium citrate, 1 g l⁻¹ fructose, and 200 ml l⁻¹ egg yolk. The pH of the solution was adjusted to 6.4 by addition of NaOH.

Extender solution for secondary dilution of spermatozoa: 0.5 g l⁻¹ Eska1500 calcium carbonate, 54 g l⁻¹ fructose, 170 g l⁻¹ glycerol and 12 g l⁻¹ sodium alginate (mixture of UP LVG and UP VLVG). Both extenders contain standard antibiotic cocktail giving at least the final concentration required in EU dir 88/407.

Dilution, Immobilization and Cryoconservation of Bull Spermatozoa

Bovine spermatozoa were harvested at the Geno facilities. Immediately after harvesting, the spermatozoa were diluted to a concentration of 133×10⁶ cells per ml in the extender solution for first time dilution. The resulting solution containing spermatozoa was then cooled to 4° C. After cooling to 4° C., the solution was mixed with an equal volume of the extender solution for secondary dilution. The mixture was added D-(+)-Gluconic acid δ-lactone to a final concentration of 55 mM in order to initialize gelling, and filled on semen straws. The straws were stored at 4° C. for approximately 4.5 hours and frozen in liquid N₂ according to standard procedures for cryoconservation. The ratio of UP LVG and UP VLVG in the solution for secondary dilution was varied in order to create alginate gels with varying mechanical strength.

Evaluation of Mechanical Strength 10 straws of frozen semen per processing were thawed at 37° C. for 1 minute and subsequently aligned in parallel in close contact and centered on a metal plate. A Texture analyzer TA XT Plus (Stable micro systems, Godalming, Surrey, UK) equipped with a P/35 probe (35 mm DIA CYLINDER ALUMINIUM) was used in order to quantify the mechanical strength of the gel from the semen straws. The measurements (test mode compression) was run using a 1 kg load cell at a test speed 0.1 mm/s to 80% strain. The mechanical strength was quantified as the initial linear incline (between 0.05 and 0.1 mm) of the force against deformation of the gel. The mechanical strength of gels from straws characterized as weak or soft by manual assessments as in example 1 was measured to 43 g/mm. The mechanical strength of gels from straws characterized as strong by manual assessments was measured to 90 g/mm.

Example 3: Coated Insemination Straw

Preparation of Coated Insemination Straws

Materials: polyvinyl alcohol Selvol 523 and Selvol 325 from Sekesui Specialty Chemicals Europe S.L. (Tarragonia, Spain), Carboxy methyl cellulose (CMC): CEKOL, Cellulose gum, Sodium Carboxymethyl Cellulose E466 from CP Kelco, a mixture of methylcellulose and hydroxypropylmethylcellulose Benecel MP 812W from Ashland Wilmington (Delaware USA), a mixture of methyl cellulose and hydroxypropyl methylcellulose, hypromellose Methocel K100 from Dow Chemical Company, ascorbic acid from Sigma Aldrich, hydrochloric acid AnalaR NORMAPUR® from VWR.

1) Insemination straws were coated by flushing with a mixture of 13.6 µmol/mL of ascorbic acid aqueous solution and 3% PVA (Poly Vinyl Alcohol) in water or 5% PVA (Poly Vinyl Alcohol).
2) Insemination straws were coated by flushing with a mixture of 13.6 µmol/mL of ascorbic acid aqueous solution and 1.5% CMC (Carboxy Methyl Cellulose) in water (coating solutions). The straws were dried in motion in vacuum at room temperature after flushing with the coating solutions.
3) Insemination straws were coated by flushing with a mixture of 13.6 µmol/mL of ascorbic acid aqueous solution and 1.5% Benecel MP 812 W (methylcellulose and hydroxypropylmethylcellulose) in water or a mixture of 13.6 µmol/mL of ascorbic acid aqueous solution and 1.5% Methocel K100 (methyl cellulose and hydroxypropyl methylcellulose-hypromellose) in water (coating solutions). The straws were dried in motion in vacuum at room temperature after flushing with the coating solutions.
4) Insemination straws were coated by flushing with a mixture of 35 µmol/mL of hydrochloric acid aqueous solution and 3% PVA (Poly Vinyl Alcohol) in water or 5% PVA (Poly Vinyl Alcohol) in water (coating solutions). The straws were dried in motion in vacuum at room temperature after flushing with the coating solutions.

The cellulose type of polymers such as CMC (Carboxy Methyl Cellulose), Benecel MP 812 W (methylcellulose and hydroxypropylmethylcellulose) and Methocel K100 (methyl cellulose and hydroxypropyl methylcellulose-hypromellose) are not compatible with strong acids like hydrochloric acid. For this type of polymers weak acids like ascorbic acid or glucuronic acid with pKa>3 are suitable. Strong acids react with cellulose type polymers and lead to degradation of the polymer matrix or crosslinking.

Source of Spermatozoa

Bovine spermatozoa were collected at the Geno facilities at Store Ree in Stange, Norway.

Buffer Solutions

The following extender solutions were used:
Extender for first dilution of spermatozoa: 1.45 g l⁻¹ Trizma hydrochloride glucose, 0.4 g l⁻¹ sodium citrate, 1 g l⁻¹ fructose, and 200 ml l⁻¹ egg yolk. The pH of the solution was adjusted to 6.4 by addition of NaOH.
Extender solution for secondary dilution of spermatozoa: 5 g l⁻¹ ViCality Extra Light calcium carbonate (Speciality Minerals inc, Bethlehem, PA), 54 g l⁻¹ fructose, 170 g l⁻¹ glycerol and 10 g l⁻¹ UP-LVG sodium alginate (NovaMatrix, Sandvika, Norway). Both extenders contain standard antibiotic cocktail giving at least the final concentration required in EU dir 88/407.

Dilution and Immobilization of Bull Spermatozoa

Bovine spermatozoa were harvested at the Geno facilities. Immediately after harvesting, the spermatozoa were diluted to a concentration of 133×10⁶ cells per ml in the extender solution for first time dilution. The resulting solution containing spermatozoa was then cooled to 4° C. After cooling to 4° C., the solution was mixed with an equal volume of the extender solution for secondary dilution.

The solution containing spermatozoa were then transferred insemination straws coated as described above under preparation of coated insemination straws, point 1-4. The insemination straws were stored at 4° C. for gel formation.

Evaluation of Gelation and Gel Strengths and the Motility of the Spermatozoa

The straws were examined for formation of gel and the viability of the immobilized spermatozoa was assessed after 3 and 24 hours of storage at 4° C. The results are summarized in table 1.1. Gel was formed within the all straws 3 hours after filling. Only some or minor changes in gel strength within the straws was observed between 3 and 24 hours.

The motility of the spermatozoa was assessed using microscopic evaluation. Prior to measurement of motility, the alginate gel was liquefied in modified IVT solution (3 g l⁻¹ glucose, 20 g l⁻¹ sodium citrate, 2.1 g l⁻¹ NaHCO₃, 1.16 g l⁻¹ NaCl, 3 g l⁻¹ EDTA, pH 7.35) by adding the content of an insemination straw to 0.9 ml of modified IVT solution in an Eppendorf tube and shaking the tube carefully on a tube-tumbler for approximately 10 minutes. The tubes were preheated for minimum 15 minutes in a heat-block at 37° C. prior to microscopic assessment of motility. Approximately 3 µl of the solution was added to a preheated microscope slide and immediately inspected using a light microscope. The number of motile spermatozoa in each sample was estimated to the nearest 5% interval.

The results are summarized in table 1. Between 60 and 80% of the spermatozoa were motile when assessed 3 hours after filling of straws with all straws tested. When assessed after 24 hours, approximately 40 to 65% of the spermatozoa were motile in the tested straws.

TABLE 1

Summary of results with coated straws

| Straw | Assessment after 3 hours at 4° C. | | Assessment after 24 hours at 4° C. | |
|---|---|---|---|---|
| | Gel formation | Motility | Gel formation | Motility |
| 1.5% Benecel | gel | 70% | firm gel | 50% |
| 1.5% CMC | gel | 60% | firm gel | 60% |
| 5% PVA 325 | gel | 60-70% | firm gel | 50% |
| 5% PVA 523 | soft gel | 70% | gel | 65% |
| 3% PVA 523 | gel | 60% | firm gel | 40-50% |
| 1.5% Methocel | gel | 60% | Firm gel | 50% |

Example 4: Release of Activator Composition from PVC Straws

Preparation of Coated Insemination Straws

Materials: Medical grade Polyvinyl chloride (PVC) dry blend (NORVINYL HA.97.00.PJ.19020.1) from INEOS Compounds, Sweden and Succinic anhydride from Sigma Aldrich.

A lab-compounder KETSE 20/40 EC extruder was used to prepare extruded PVC straws. The tubing die-head for making straws was 2 mm inner diameter and 2.5 mm outer diameter. The extruder connecting with the tubing die-head has 6 heating zones. Full barrel length is 800 mm, but the processing length was reduced to 400 mm in order to prevent degradation of PVC.

The succinic anhydride was added in an amount of 1 and 1.5 wt % respectively to the PVC. All ingredients were pre-mixed at room temperature and fed into the feeder of the extruder. The blends were melted and mixed at 190° C. Extruded straws were cooled and collected in water bath.

The extruded straws were washed shortly with additional water to remove the succinic anhydride that was on the surface of the insemination straw and the insemination straws were dried prior use.

Source of Spermatozoa

Bovine spermatozoa were collected at the Geno facilities at Store Ree in Stange, Norway.

Buffer Solutions

The following extender solutions were used:

Extender for first dilution of spermatozoa: 1.45 g l-1 Trizma hydrochloride glucose, 0.4 g l$^{-1}$ sodium citrate, 1 g l$^{-1}$ fructose, and 200 ml l$^{-1}$ egg yolk. The pH of the solution was adjusted to 6.4 by addition of NaOH.

Extender solution for secondary dilution of spermatozoa: 5 g l$^{-1}$ ViCality Extra Light calcium carbonate (Speciality Minerals inc, Bethlehem, PA), 54 g l$^{-1}$ fructose, 170 g l$^{-1}$ glycerol and 10 g l$^{-1}$ UP-LVG sodium alginate (NovaMatrix, Sandvika, Norway). Both extenders contain standard antibiotic cocktail giving at least the final concentration required in EU dir 88/407.

Dilution and Immobilization of Bull Spermatozoa

Bovine spermatozoa were harvested at the Geno facilities. Immediately after harvesting, the spermatozoa were diluted to a concentration of $133 \times 10^6$ cells per ml in the extender solution for first time dilution. The resulting solution containing spermatozoa was then cooled to 4° C. After cooling to 4° C., the solution was mixed with an equal volume of the extender solution for secondary dilution.

The solution containing spermatozoa were then transferred to insemination straws with 1 and 1.5 wt % succinic anhydride respectively. The insemination straws were stored at 4° C. for gel formation.

Evaluation of Gelation and Gel Strengths and the Motility of the Spermatozoa

The straws were examined for formation of gel and the viability of the immobilized spermatozoa was assessed after 3 and 24 hours of storage at 4° C. The results are summarized in table 2. 3 hours after filling, a gel was formed within both types of straws tested. Only minor changes in gel strength were observed within the straws between 3- and 24-hours incubation at 4° C.

The motility of the spermatozoa was assessed using microscopic evaluation. Prior to measurement of motility, the alginate gel was liquefied in modified IVT solution (3 g l$^{-1}$ glucose, 20 g l$^{-1}$ sodium citrate, 2.1 g l$^{-1}$ NaHCO$_3$, 1.16 g l$^{-1}$ NaCl, 3 g l$^{-1}$ EDTA, pH 7.35) by adding the content of an insemination straw to 0.9 ml of modified IVT solution in an Eppendorf tube and shaking the tube carefully on a tube-tumbler for approximately 10 minutes. The tubes were preheated for minimum 15 minutes in a heat-block at 37° C. prior to microscopic assessment of motility. Approximately 3 µl of the solution was added to a preheated microscope slide and immediately inspected using a light microscope. The number of motile spermatozoa in each sample was estimated to the nearest 5% interval.

The results are summarized in table 2. Between 60 and 70% of the spermatozoa were motile in when assessed 3 hours after filling of straws with all straws tested. When assessed after 24 hours, approximately 50 to 60% of the spermatozoa were motile in the tested straws.

TABLE 2

Summary of results with PVC straws

| Straw | Assessment after 3 hours at 4° C. | | Assessment after 24 hours at 4° C. | |
|---|---|---|---|---|
| | Gel formation | Motility | Gel formation | Motility |
| PVC, 1% suc. anh. | soft gel | 60-70% | gel | 55-60% |
| PVC, 1.5% suc. anh. | firm gel | 60% | firm gel | 50% |

The invention claimed is:

1. A kit for preparing a sustained release composition, the kit comprising a first container and a second container; the first container comprising an activator composition and either a first diffusion barrier or a second diffusion barrier; the second container comprising an ionically crosslinkable biocompatible polymer, an inactive crosslinker and optionally a material to be released; the first and/or second diffusion barrier allowing the activator composition and the inactive crosslinker to come in contact with each other at a delayed rate to provide an active crosslinker thereby ensuring delayed and sustained release of the active crosslinker;
wherein
the first container and/or the second container are of a size and form which allows the ionically crosslinkable biocompatible polymer to come into contact with the active crosslinker throughout the first container and/or the second container thereby ensuring that there is crosslinked biocompatible polymer throughout the first container and/or the second container;
the ionically crosslinkable biocompatible polymer is a divalent cation crosslinkable biocompatible polymer;
the term "active crosslinker" refers to ions suitable for crosslinking the ionically crosslinkable biocompatible polymer;
the term "inactive crosslinker" refers to a compound that requires activation by the activator composition in order to be able to release ions for crosslinking the ionically crosslinkable biocompatible polymer; and
wherein the first container comprises the first diffusion barrier; the activator composition in admixture with the first diffusion barrier is coated on an inner surface of the first container;
wherein the first container comprises the first diffusion barrier; the activator composition and the first diffusion barrier are coated on the inner surface of the first container in separate layers thereby forming an inner surface layer and an intermediate layer, the intermediate layer comprising the activator composition;
wherein the first container comprises the second diffusion barrier and is made from a first polymer material; i) the activator composition, ii) the activator composition embedded or encapsulated within a second polymer material, or iii) a mixture of i) and ii) being extruded into the first polymer material during production of the first container; the second diffusion barrier being the first polymer material, the second polymer material or a combination thereof; or
wherein the first container comprises the second diffusion barrier and is made from a first polymer material; a third polymer material in admixture with i) the activator composition, ii) the activator composition embedded or encapsulated within a second polymer material, or iii) a mixture of i) and ii) being co-extruded with the first polymer material during production of the first container thereby forming an inner surface layer and an outer surface layer, the inner surface layer comprising the activator composition; and the second diffusion barrier being the second polymer material, the third polymer material or a combination thereof.

2. The kit according to claim 1, wherein the ionically crosslinkable biocompatible polymer is ionically crosslinkable alginate.

3. The kit according to claim 1, wherein the ionically crosslinkable biocompatible polymer is ionically crosslinkable alginate; the alginate having more guluronic acid residues than mannuronic acid residues.

4. The kit according to claim 1, wherein the material to be released is selected from the group consisting of biological material, therapeutic agents, diagnostic agents, and mixtures thereof.

5. The kit according to claim 1, wherein the material to be released is spermatozoa.

6. The kit according to claim 1, wherein the first diffusion barrier is selected from the group consisting of i) natural polymers; ii) synthetic polymers or copolymers; and iii) mixtures thereof.

7. The kit according to claim 1, wherein the inactive crosslinker is a divalent cation salt which is insoluble in water.

8. The kit according to claim 1, wherein the activator composition comprises a proton donor or a compound which upon contact with water is transformed into a proton donor; and the inactive crosslinker is a compound which releases ions for crosslinking the ionically crosslinkable biocompatible polymer upon contact with the proton donor.

9. The kit according to claim 1, wherein
the ionically crosslinkable biocompatible polymer is ionically crosslinkable alginate, the alginate having more guluronic acid residues than mannuronic acid residues; and
the material to be released is spermatozoa.

10. The kit according to claim 1, wherein the first container and/or the second container has the shape of a tube with an inner diameter of less than 1 cm.

11. A method of breeding of animals, comprising administering a sustained release composition prepared from the kit of claim 1.

12. A kit for preparing a sustained release composition, the kit comprising a first container and a second container; the first container comprising an inactive crosslinker and either a first diffusion barrier or a second diffusion barrier; the second container comprising an ionically crosslinkable biocompatible polymer, an activator composition and optionally a material to be released; the first and/or second diffusion barrier allowing the activator composition and the inactive crosslinker to come in contact with each other at a delayed rate thereby ensuring delayed and sustained release of an active crosslinker;
wherein
the first container and/or the second container are of a size and form which allows the ionically crosslinkable biocompatible polymer to come into contact with the active crosslinker throughout the first container and/or the second container thereby ensuring that there is crosslinked biocompatible polymer throughout the first container and/or the second container;
the ionically crosslinkable biocompatible polymer is a divalent cation crosslinkable biocompatible polymer;
the term "active crosslinker" refers to ions for crosslinking the ionically crosslinkable biocompatible polymer;
the term "inactive crosslinker" refers to a compound that requires activation by the activator composition in order to be able to release ions for crosslinking the ionically crosslinkable biocompatible polymer;
and
wherein the first container comprises the first diffusion barrier; the inactive crosslinker in admixture with the first diffusion barrier is coated on inner surface of the first container;
wherein the first container comprises the first diffusion barrier; the inactive crosslinker and the first diffusion barrier are coated on the inner surface of the first container in separate layers thereby forming an inner surface layer and an intermediate layer, the intermediate layer comprising the inactive crosslinker;
wherein the first container comprises the second diffusion barrier and is made from a first polymer material; i) the inactive crosslinker, ii) the inactive crosslinker embedded or encapsulated within a second polymer material, or iii) a mixture of i) and ii) being extruded into the first polymer material during production of the first container; the second diffusion barrier being the first polymer material, the second polymer material or a combination thereof; or wherein the first container comprises the second diffusion barrier and is made from a first polymer material; a third polymer material in admixture with i) the inactive crosslinker, ii) the inactive crosslinker embedded or encapsulated within a second polymer material, or iii) a mixture of i) and ii) being co-extruded with the first polymer material during production of the first container thereby forming an inner surface layer and an outer surface layer, the inner surface layer comprising the inactive crosslinker; and the second diffusion barrier being the second polymer material, the third polymer material or a combination thereof.

13. The kit according to claim 12, wherein the ionically crosslinkable biocompatible polymer is ionically crosslinkable alginate.

14. The kit according to claim 12, wherein the ionically crosslinkable biocompatible polymer is ionically crosslinkable alginate; the alginate having more guluronic acid residues than mannuronic acid residues.

15. The kit according to claim 12, wherein the material to be released is selected from the group consisting of biological material, therapeutic agents, diagnostic agents, and mixtures thereof.

16. The kit according to claim 12, wherein the material to be released is spermatozoa.

17. The kit according to claim 12, wherein the first diffusion barrier is selected from the group consisting of i) natural polymers; ii) synthetic polymers or copolymers; and iii) mixtures thereof.

18. The kit according to claim 12, wherein the inactive crosslinker is a divalent cation salt which is insoluble in water.

19. The kit according to claim 12, wherein the activator composition comprises a proton donor or a compound which upon contact with water is transformed into a proton donor; and the inactive crosslinker is a compound which releases ions for crosslinking the ionically crosslinkable biocompatible polymer upon contact with the proton donor.

20. The kit according to claim 12, wherein
the ionically crosslinkable biocompatible polymer is ionically crosslinkable alginate, the alginate having more guluronic acid residues than mannuronic acid residues; and
the material to be released is spermatozoa.

21. The kit according to claim 12, wherein the first container and/or second container has the shape of a tube with an inner diameter of less than 1 cm.

22. A method of breeding of animals, comprising administering a sustained release composition prepared from the kit of claim 12.

23. A kit for preparing a sustained release composition, the kit comprising a first container and a second container; the first container comprising an active crosslinker and either a first diffusion barrier or a second diffusion barrier; the second container comprising an ionically crosslinkable biocompatible polymer and optionally a material to be released; the first and/or second diffusion barrier allowing delayed and sustained release of the active crosslinker; wherein
the first container and/or the second container are of a size and form which allows the ionically crosslinkable biocompatible polymer to come into contact with the active crosslinker throughout the first container and/or the second container thereby ensuring that there is crosslinked biocompatible polymer throughout the first container and/or the second container;
the ionically crosslinkable biocompatible polymer is a divalent cation crosslinkable biocompatible polymer;
the term "active crosslinker" refers to ions for crosslinking the ionically crosslinkable biocompatible polymer; and
wherein the first container comprises the first diffusion barrier; the active crosslinker in admixture with the first diffusion barrier is coated on the inner surface of the first container;

wherein the first container comprises the first diffusion barrier; the active crosslinker and the first diffusion barrier are coated on an inner surface of the first container in separate layers thereby forming an inner surface layer and an intermediate layer, the intermediate layer comprising the active crosslinker;

wherein the first container comprises the second diffusion barrier and is made from a first polymer material; i) the active crosslinker, ii) the active crosslinker embedded or encapsulated within a second polymer material, or iii) a mixture of i) and ii) being extruded into the first polymer material during production of the first container; the second diffusion barrier being the first polymer material, the second polymer material or a combination thereof; or wherein the first container comprises the second diffusion barrier and is made from a first polymer material; a third polymer material in admixture with i) the active crosslinker, ii) the active crosslinker embedded or encapsulated within a second polymer material, or iii) a mixture of i) and ii) being co-extruded with the first polymer material during production of the first container thereby forming an inner surface layer and an outer surface layer, the inner surface layer comprising the active crosslinker; and the second diffusion barrier being the second polymer material, the third polymer material or a combination thereof.

24. The kit according to claim 23, wherein the ionically crosslinkable biocompatible polymer is ionically crosslinkable alginate.

25. The kit according to claim 23, wherein the ionically crosslinkable biocompatible polymer is ionically crosslinkable alginate; and the alginate having more guluronic acid residues than mannuronic acid residues.

26. The kit according to claim 23, wherein the material to be released is selected from the group consisting of biological material, therapeutic agents, diagnostic agents, and mixtures thereof.

27. The kit according to claim 23, wherein the material to be released is spermatozoa.

28. The kit according to claim 23, wherein the first diffusion barrier is selected from the group consisting of i) natural polymers; ii) synthetic polymers or copolymers; and iii) mixtures thereof.

29. The kit according to claim 23, wherein
the ionically crosslinkable biocompatible polymer is ionically crosslinkable alginate, the alginate having more guluronic acid residues than mannuronic acid residues; and
the material to be released is spermatozoa.

30. The kit according to claim 23, wherein the first container and/or second container has the shape of a tube with an inner diameter of less than 1 cm.

31. A method of breeding of animals, comprising administering a sustained release composition prepared from the kit of claim 23.

* * * * *